(12) United States Patent
Li

(10) Patent No.: US 12,722,595 B1
(45) Date of Patent: Sep. 1, 2026

(54) AUTOMOBILE STEERING WHEEL LOCKING DEVICE

(71) Applicant: SHENZHEN JAVDUN ZHINENGTECHCO, LTD, Guangdong (CN)

(72) Inventor: Fen Li, Guangdong (CN)

(73) Assignee: SHENZHEN JAVDUN ZHINENGTECHCO, LTD, Guangdong (CN)

( * ) Notice: Subject to any disclaimer, the term of this patent is extended or adjusted under 35 U.S.C. 154(b) by 0 days.

(21) Appl. No.: 19/377,390

(22) Filed: Nov. 3, 2025

(51) Int. Cl.

| | |
|---|---|
| ***B60R 25/00*** | (2013.01) |
| ***B60R 25/10*** | (2013.01) |
| ***B60R 25/24*** | (2013.01) |
| ***B60R 25/25*** | (2013.01) |

(52) U.S. Cl.
CPC ........ *B60R 25/007* (2013.01); *B60R 25/1001* (2013.01); *B60R 25/24* (2013.01); *B60R 25/252* (2013.01)

(58) Field of Classification Search
CPC ... B60R 25/00; B60R 25/007; B60R 25/1001; B60R 25/24; B60R 25/252; Y10T 70/5889; Y10T 70/5894
USPC .................................................... 70/237, 209
See application file for complete search history.

(56) References Cited

U.S. PATENT DOCUMENTS

| | | | | |
|---|---|---|---|---|
| 5,412,963 A * | 5/1995 | Carlo | B60R 25/0225 | 70/279.1 |
| 7,213,427 B1 * | 5/2007 | Lian | B60R 25/0225 | 70/279.1 |
| 9,728,022 B2 * | 8/2017 | Gengler | G07C 9/00174 | |
| 2009/0145180 A1 * | 6/2009 | Yu | B60R 25/0225 | 70/209 |
| 2012/0324968 A1 * | 12/2012 | Goren | G07C 9/00309 | 70/280 |
| 2023/0220704 A1 * | 7/2023 | Duci | E05B 81/90 | 70/237 |

FOREIGN PATENT DOCUMENTS

CN 101936098 A * 1/2011

* cited by examiner

*Primary Examiner* — Suzanne L Barrett
(74) *Attorney, Agent, or Firm* — Hawaii Patent Services; Nathaniel K. Fedde; Kenton N. Fedde

(57) ABSTRACT

The present disclosure relates to an automobile steering wheel locking device, comprising a sliding part and a main body. The sliding part includes a fixing part formed by splicing left and right base bodies, a left clamping jaw, and a U-shaped pin with a one-way locking groove; the main body is provided with an accommodating space, a locking assembly, a right clamping jaw, and a window breaking part with a window breaking hammer. The locking assembly supports electronic unlocking methods such as fingerprint, password, or card swiping, and allows mechanical unlocking when the power is exhausted. It also comprises a one-way self-locking mechanism and a rebound mechanism. The two parts are detachable, balancing anti-theft, emergency escape, and maintenance convenience.

8 Claims, 19 Drawing Sheets

AUTOMOBILE STEERING WHEEL LOCKING DEVICE

TECHNICAL FIELD

The present disclosure relates to the technical field of security and anti-theft locks, particularly to an automobile steering wheel locking device.

BACKGROUND

Currently, automobile steering wheel locking devices still exhibit significant shortcomings in functional design, with the vast majority of products long dominated by traditional mechanical locks, their operation heavily reliant on a single physical key. This structure not only results in cumbersome unlocking processes and inconvenient operation but also carries risks such as the key being prone to breakage, loss, or duplication, further introducing safety hazards. Moreover, in specific usage scenarios such as emergencies or when the user's hands are occupied, the unlocking experience of such devices is particularly rigid. Without an independent and reliable mechanical backup unlocking mechanism for support, users can easily find themselves unable to unlock the device promptly, directly impacting the product's practicality and reliability.

SUMMARY

The present disclosure provides an automobile steering wheel locking device to address the issues raised in the background art.

To achieve the above-mentioned object, the present disclosure adopts the following technical solution:

An automobile steering wheel locking device comprises a sliding part provided with a left clamping jaw for gripping a steering wheel and a locking rod extending away from the left clamping jaw, a side wall of the locking rod being provided with at least one locking groove;

a main body detachably connected to the sliding part and provided with a right clamping jaw for gripping the steering wheel and arranged opposite to the left clamping jaw, the main body comprising a sliding groove; a locking assembly arranged inside the main body, the locking assembly comprising: a mechanical lock module, comprising a mechanical lock assembly drivable by a mechanical key, the mechanical lock assembly being provided with a mechanical drive shaft; an electronic lock module, comprising an electronic lock assembly that receives a control signal and drives a action, the electronic lock assembly being provided with an electronic drive shaft; and a locking plate slidably installed in the sliding groove of the main body, the locking plate being provided with two drive holes respectively cooperating with the mechanical drive shaft and the electronic drive shaft, enabling either drive shaft to rotate and drive the locking plate to move within the sliding groove, the locking plate further being provided with an abutting part cooperating with the locking groove. The movement of the locking plate drives the abutting part thereon to cooperate with a locking rod of the sliding part to achieve locking or unlocking of the steering wheel; and transmission paths of the mechanical lock module and the electronic lock module are independent of each other, and either module is capable of individually driving the locking plate to complete locking or unlocking operations.

The beneficial effects of the present disclosure compared to the prior art are as follows:

To address the issues of existing mechanical locks relying solely on physical keys, which are prone to loss and duplication, and limited unlocking scenarios, as well as electronic locks' excessive dependence on power supply, leading to complete failure during power outages, the present disclosure integrates multiple unlocking methods on the electronic end, including fingerprint recognition, password input, card swiping, APP unlocking, temporary password unlocking, and remote unlocking, meeting the convenience needs of various scenarios. On the mechanical end, an independent mechanical lock assembly and drive shaft structure are retained, ensuring that even if the power supply assembly is depleted, unlocking can still be driven by a mechanical key. Additionally, a charging port is included to sustain electronic functionality, significantly reducing the risk of "unlocking failure." The present disclosure integrates a window breaking hammer at the distal end of the main body through an engaging groove, leveraging the "must-use, must-carry" feature of steering wheel locks to avoid the drawback of easily forgotten standalone window breaking tools. The window breaking part is equipped with an external protective cover, balancing daily protection and emergency quick access, enabling the locking device to serve both anti-theft and emergency escape functions.

BRIEF DESCRIPTION OF DRAWINGS

The drawings, which form part of this application, are provided to further illustrate the present disclosure. The illustrative embodiments and the descriptions thereof are intended to explain the present disclosure and do not constitute undue limitations. In the drawings.

Figure 1:
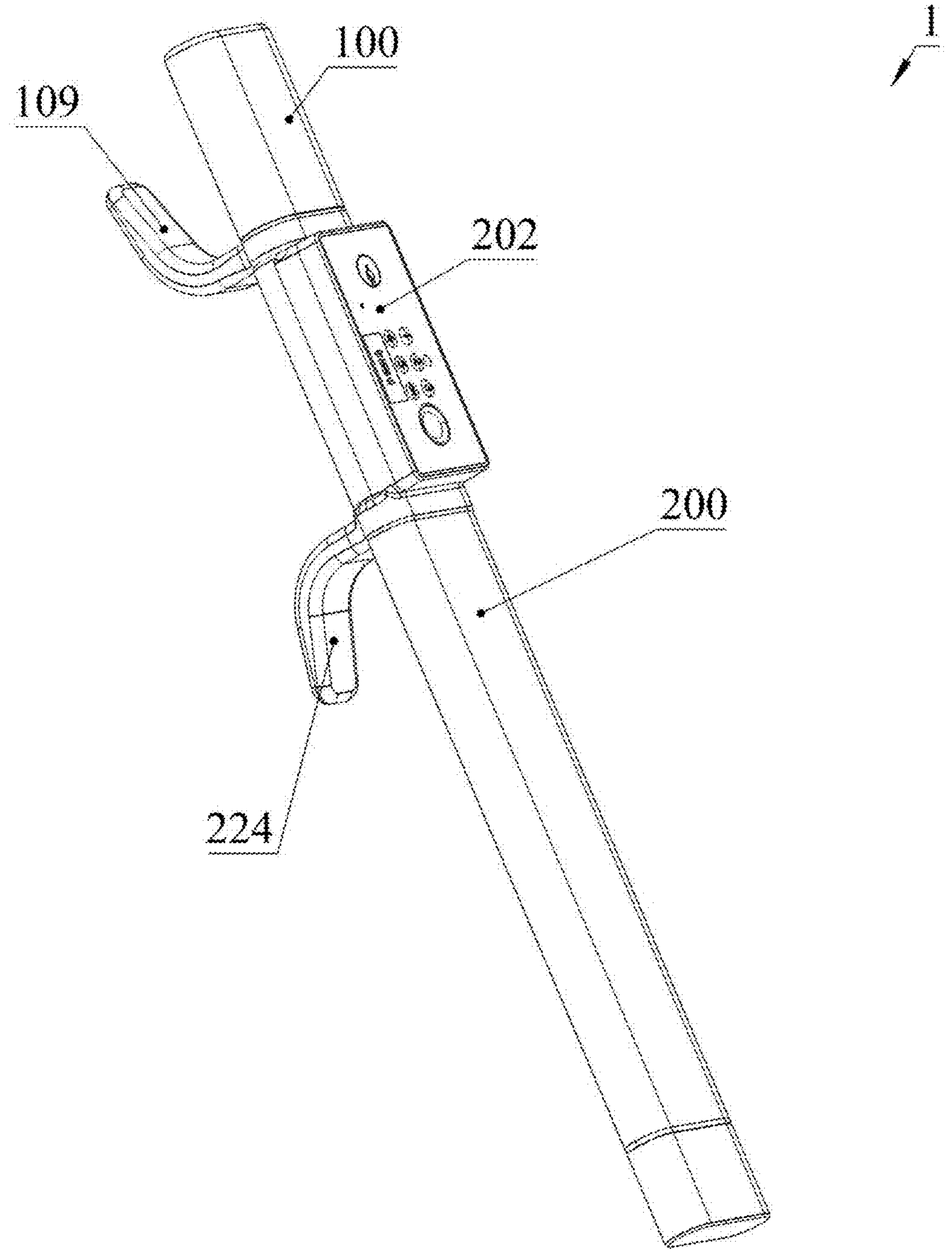
FIG. 1 is a perspective schematic view of an embodiment provided by the present disclosure.
Figure 2:
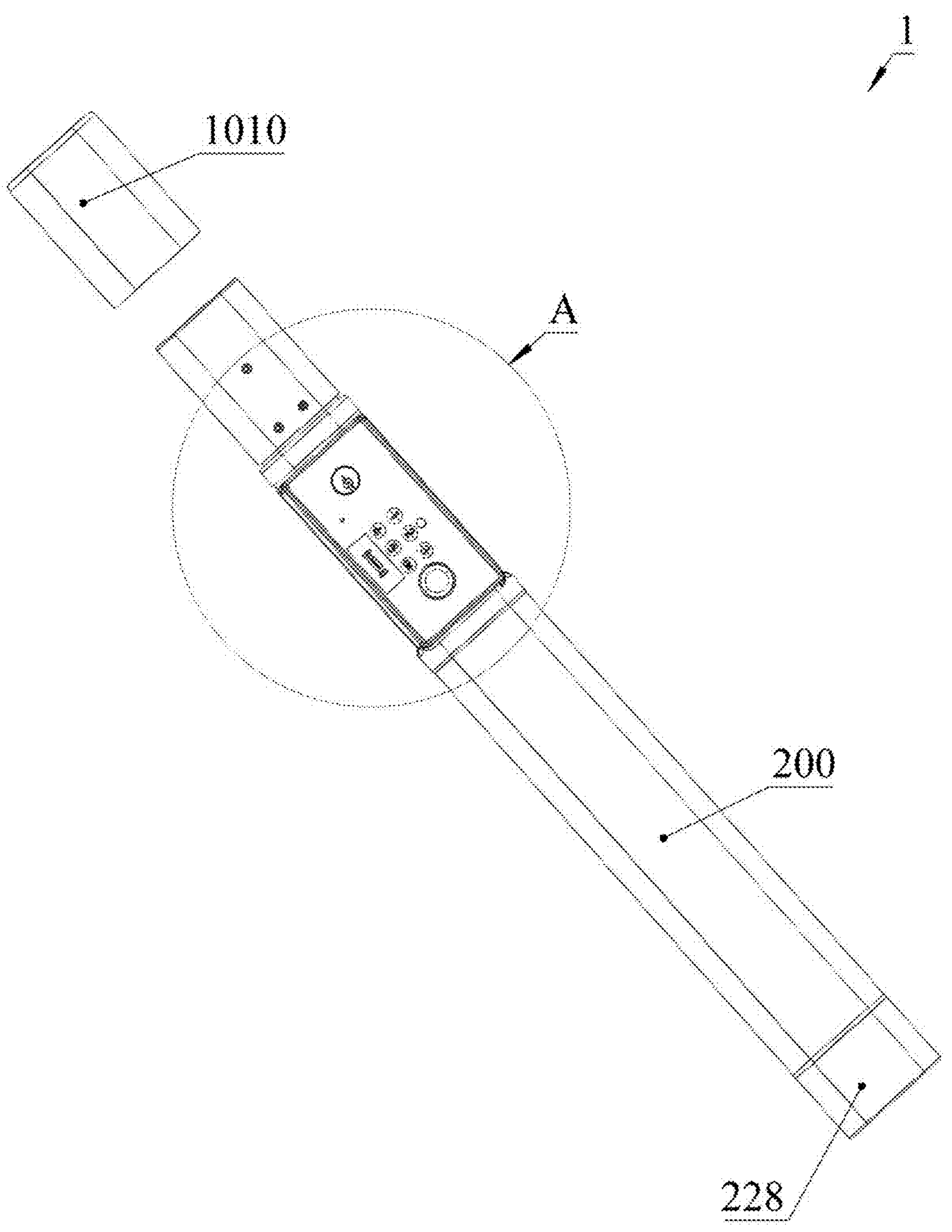
FIG. 2 is a structural schematic view of the fixing part in the embodiment of FIG. 1.

Reference signs: Automobile Steering Wheel Locking Device (1); Sliding Part (100); Fixing Part (101); Left Base Body (102); Right Base Body (103); Reinforcing Rib (105); Upright Post (104); Installation Hole (106); First Through Hole (107); Fixed Housing (1010); Installation Space (108); Left Clamping Jaw (109); Mounting Block (110); Second Through Hole (111); U-Shaped Pin (112); Fixing Rod (113); Locking Rod (114); Locking Groove (115); First Inclined Surface (116); Main Body (200); Accommodating Space (201); Locking Assembly (202); Fingerprint Lock (203); Password Key (204); Sensing Area (205); Mechanical Lock Module (206); Fixing Frame (207); Installation Groove (208); Control Circuit Board (209); Lock Cylinder (210); Mechanical Transmission Shaft (212); Motor (211); Driving Gear (213); Driven Gear (214); Mechanical Drive Disc (215); Mechanical Drive Shaft (216); Locking Plate (217); Mechanical Drive Hole (218); Top Plate (219); Engaging Post (220); Second Inclined Surface (221); Extension Post (222); Spring (223); Right Clamping Jaw (224); Window Breaking Part (225); Engaging Groove (226); Window Breaking Hammer (227); Protective Cover (228); Charging Port (229); Power Supply Assembly (300); Sliding Groove (301); Limiting Part (303); Anti-Prying Alarm Switch (500); Buzzer (501); Lighting Assembly (502); Electronic Drive Disc (2150); Electronic Drive Shaft (2160); Electronic Drive Hole (2180); Electronic Transmission Shaft (2120).

DESCRIPTION OF EMBODIMENTS

The technical solutions in the embodiments of the present disclosure will be clearly and completely described below with reference to the accompanying drawings in the embodiments of the present disclosure. It is evident that the described embodiments are only a part of the embodiments of the present disclosure, rather than all of them. The following description of at least one exemplary embodiment is illustrative and shall not be construed as any limitation on the present disclosure or its application or use. Based on the embodiments of the present disclosure, all other embodiments obtained by those of ordinary skill in the art without creative efforts shall fall within the scope of protection of the present disclosure.

It should be noted that the terminology used herein is for the purpose of describing specific embodiments only and is not intended to limit the exemplary embodiments according to the present application. As used herein, unless the context clearly indicates otherwise, the singular forms are also intended to include the plural forms. Furthermore, it should be understood that when the terms “comprise” and/or “include” are used in this specification, they indicate the presence of features, steps, operations, devices, components, and/or combinations thereof.

Unless otherwise specifically stated, the relative arrangements, numerical expressions, and values of components and steps described in these embodiments do not limit the scope of the present disclosure. At the same time, it should be understood that, for ease of description, the dimensions of various parts shown in the drawings are not drawn to actual scale. Techniques, methods, and equipment known to those of ordinary skill in the relevant art may not be discussed in detail, but where appropriate, such techniques, methods, and equipment should be considered part of the authorized specification.

As shown in FIGS. 1, 2, 4, and 18, an automobile steering wheel locking device 1 includes a sliding part 100 and a main body 200. The sliding part 100 includes a fixing part 101 and a fixed housing 1010 sleeved outside the fixing part 101. The fixing part 101 is composed of a left base body 102 and a right base body 103. Both the left base body 102 and the right base body 103 are provided with reinforcing ribs 105, and the left base body 102 is additionally equipped with an upright post 104, which has an installation hole 106 inside. The right base body 103 is provided with a first through hole 107 at a position corresponding to the installation hole 106. After the left base body 102 and the right base body 103 are assembled, bolts can be inserted through the first through hole 107 and the installation hole 106 to secure them. This assembly structure not only enhances the overall rigidity and impact resistance of the fixing part 101 but also facilitates assembly and disassembly. In other embodiments of the present disclosure (not shown), to meet the requirements of different usage scenarios for fixing strength and portability, the left base body 102 and the right base body 103 can also be connected through snap-fit, magnetic attraction, mortise-and-tenon joints, or welding, enabling diversified assembly and further improving the structure’s applicability and maintenance convenience.

Figure 4:
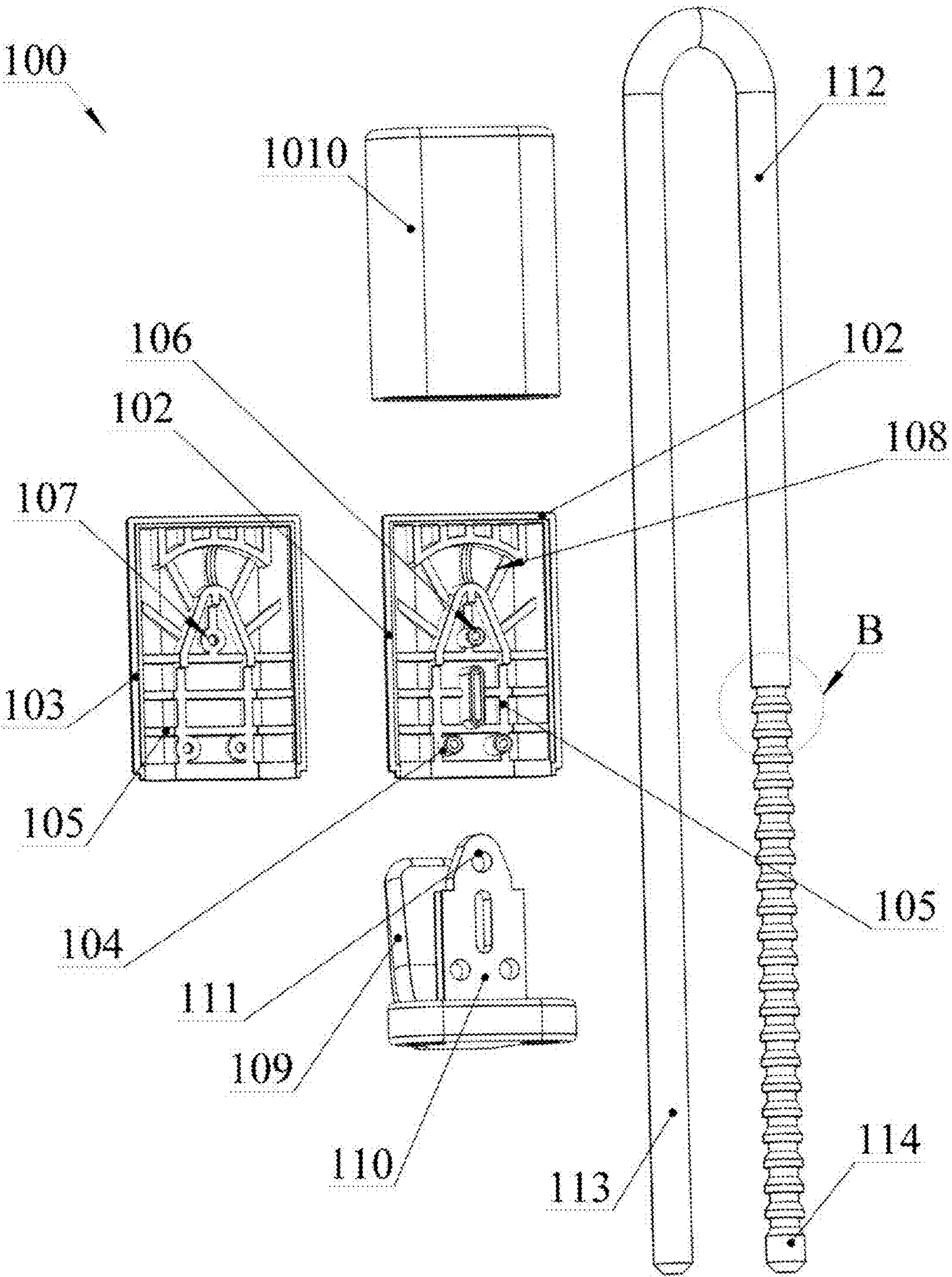
FIG. 4 is an exploded schematic view of the sliding part in the embodiment shown in FIG. 1.

Specifically, referring to FIG. 4, in this embodiment, inside the fixing part 101, the upright post 104 and the reinforcing rib 105 cooperate with each other and enclose to form an installation space 108. This structure ensures the installation space 108 has a more regular shape and a more compact layout, effectively improving the installation stability of internal components. Through the supporting role of the upright post 104 and the reinforcing rib 105, the fixing part 101 maintains high structural strength and deformation resistance when bearing mounting components, preventing loosening or displacement during use. This further enhances the overall assembly’s reliability and durability while also providing a clear structural reference for subsequent component positioning and installation, making the internal space utilization of the fixing part 101 more reasonable and the overall structure more stable.

Referring to FIGS. 1 and 4, the left clamping jaw 109 is installed in the installation space 108, extending from the installation position toward the end close to the fixing part 101. The left clamping jaw 109 includes a mounting block 110. The mounting block 110 is provided with a second through hole 111 at a position corresponding to the upright post 104 of the fixing part 101. During assembly, the upright post 104 can pass through the second through hole 111, securely positioning the mounting block 110 within the installation space 108. This interlocking fixation method establishes a reliable connection between the left clamping jaw 109 and the fixing part 101, not only improving the installation accuracy and overall stability of the clamping jaw but also effectively dispersing stress during force application, preventing loosening or displacement of the clamping jaw, thereby enhancing assembly firmness and usage durability.

Figure 5:
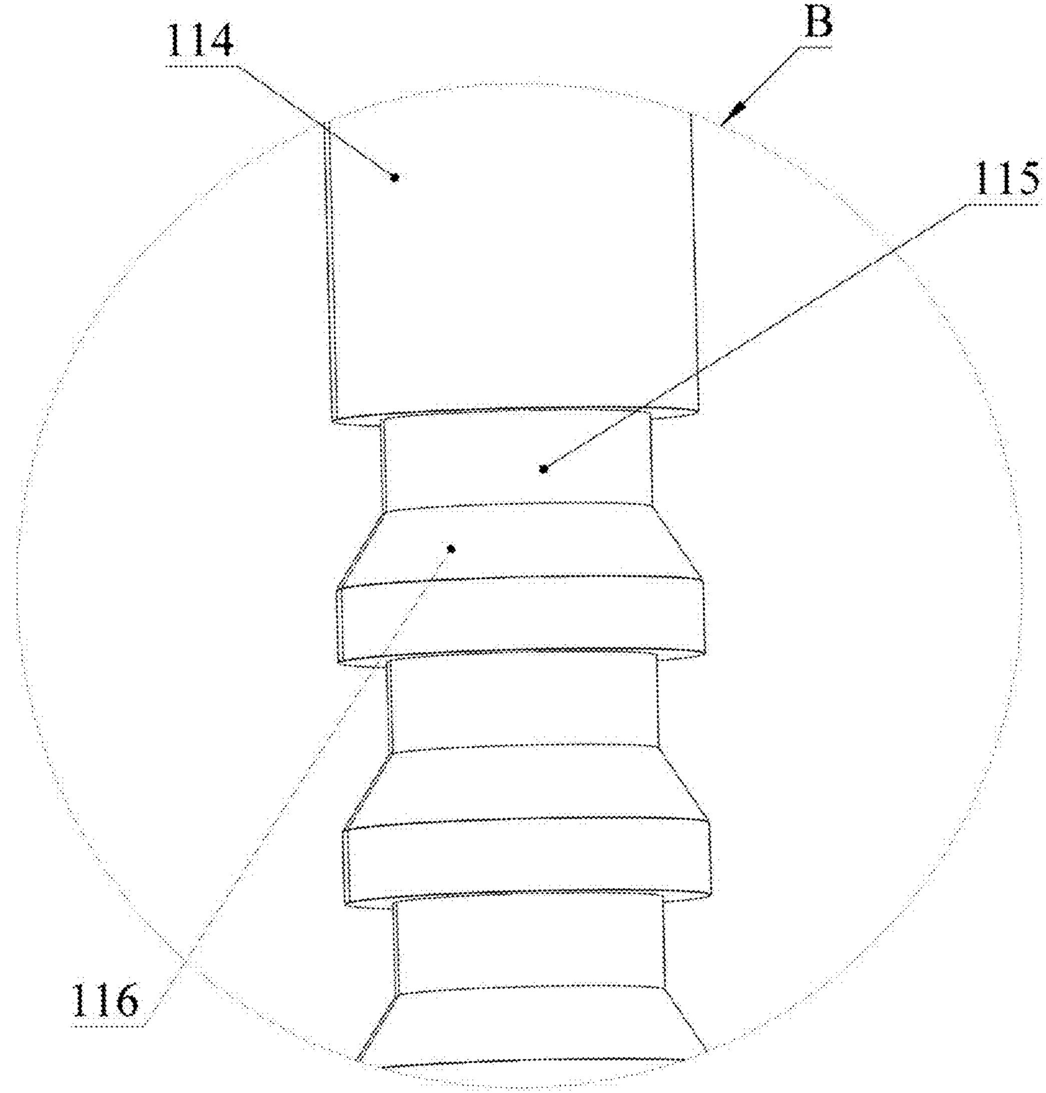
FIG. 5 is a partial schematic view of section B in the embodiment shown in FIG. 4.

Referring to FIGS. 4 and 5, a U-shaped pin 112 is also installed in the installation space 108, extending toward the end away from the fixing part 101 with a fixing rod 113 and a locking rod 114. The locking rod 114 is provided with multiple locking grooves, preferably unidirectional locking grooves 115. Specifically, the surface of the unidirectional locking groove 115 away from the fixing part 101 is a first inclined surface 116. This structure, through the arrangement of multiple locking grooves, ensures reliable positioning and fixation of the locking device at different positions, enhancing overall locking stability and safety. Meanwhile, in other embodiments of the present disclosure (not shown), the shape of the locking groove can also be designed as a circular or polygonal groove based on structural requirements to achieve the same locking function, thereby improving the structural compatibility and applicability of the device.

Figure 6:
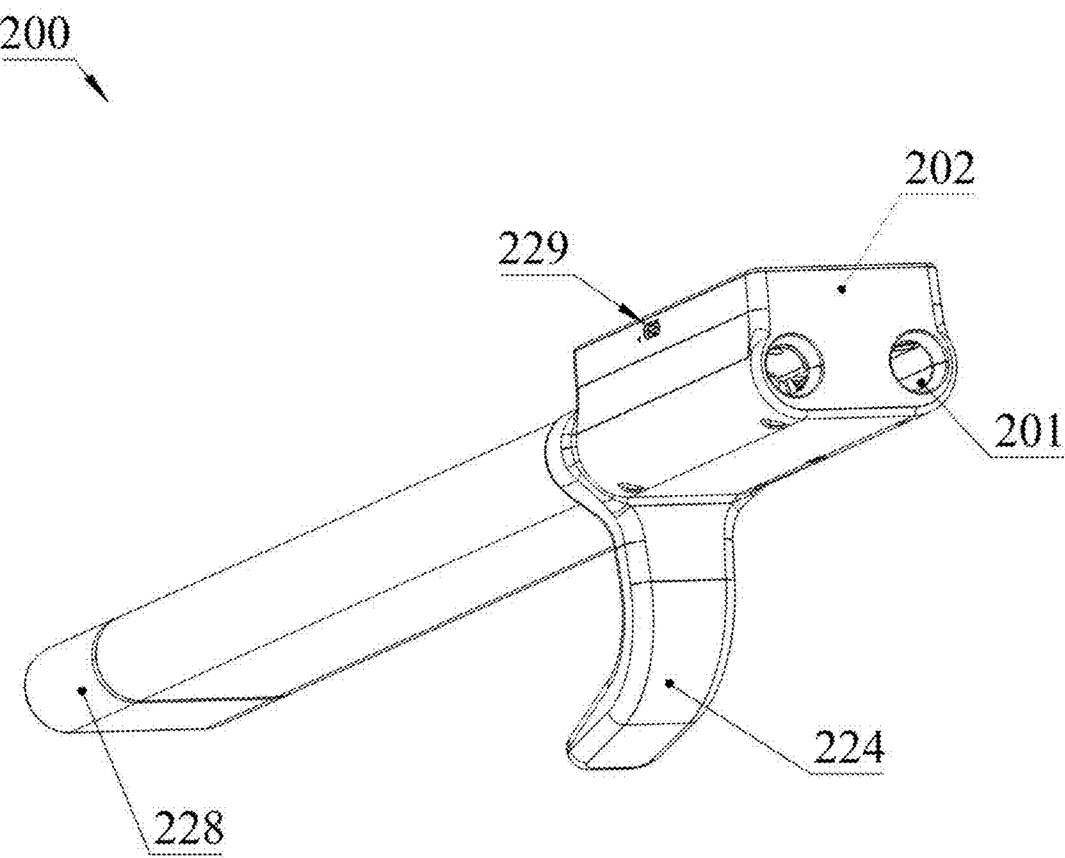
FIG. 6 is a structural schematic view of the main body in the embodiment shown in FIG. 1.

As shown in FIG. 6, the sliding part 100 is detachably connected to the main body 200 through a U-shaped pin 112. The main body 200 has an accommodating space 201 inside, into which the U-shaped pin 112 can be inserted during assembly, ensuring a secure fit between the sliding part 100 and the main body 200. This plug-in detachable structure not only guarantees connection reliability but also facilitates quick disassembly, replacement, or maintenance when needed, enhancing the device's flexibility and ease of maintenance. At the same time, it avoids structural limitations caused by fixed connections, achieving an excellent balance between safety and operational convenience in the overall design.

Figure 3:
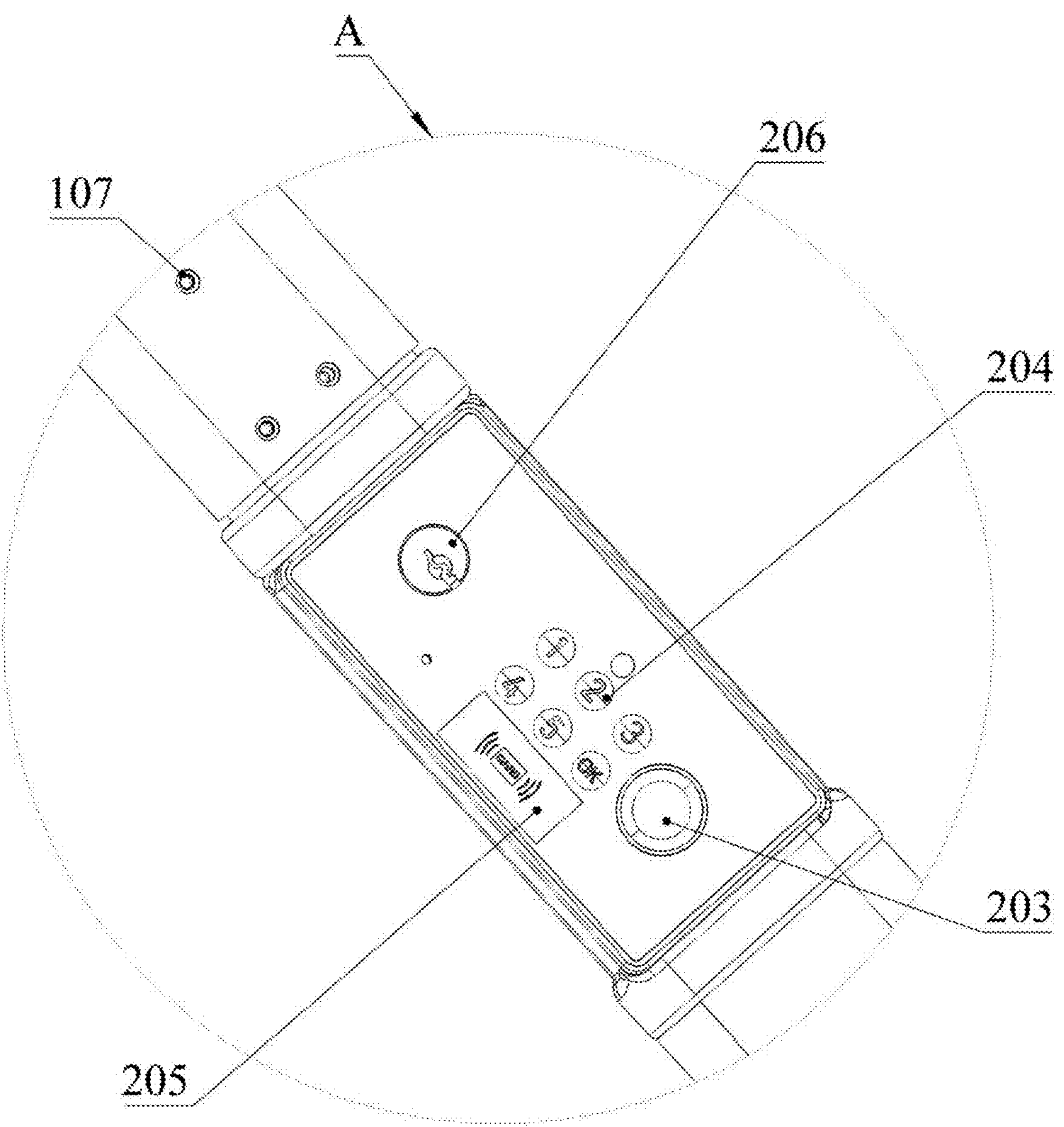
FIG. 3 is a partial schematic view of section A in the embodiment shown in FIG. 2.
Figure 10:
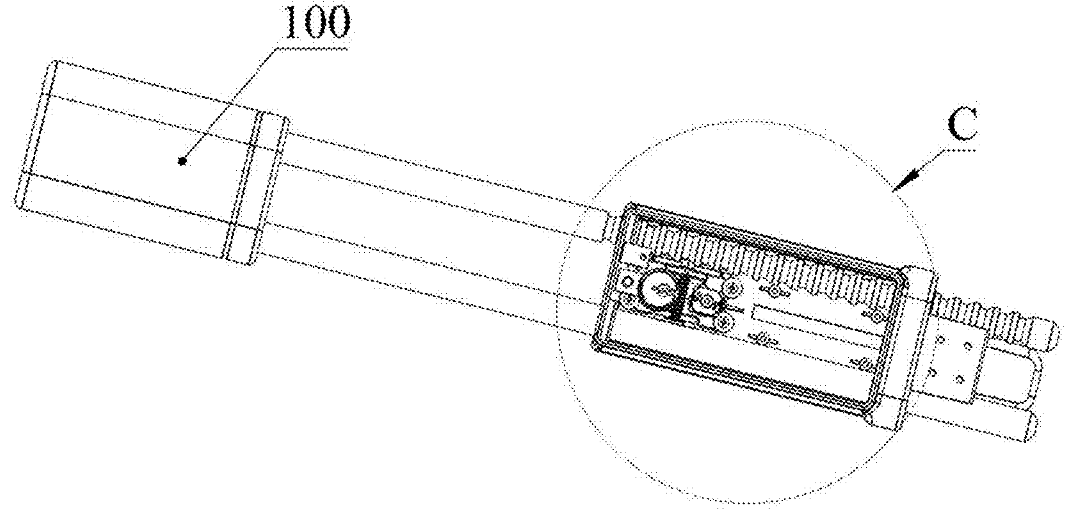
FIG. 10 is a connection schematic view of the sliding part and the locking assembly in the embodiment shown in FIG. 1.

As shown in FIGS. 3 and 10, the end of the main body 200 near the sliding part 100 is equipped with a locking assembly 202. The outer surface of the locking assembly 202 features an electronic unlocking module, a charging port 229 for power connection, and a lighting assembly 502. The electronic unlocking module includes a fingerprint lock 203 for fingerprint recognition, a password key 204 for passcode unlocking, a sensing area 205 for card recognition, and smartphone app unlocking. It can also receive external control signals through WiFi or Bluetooth communication to control the locking and unlocking of the electronic lock assembly. The electronic unlocking module offers users multiple unlocking methods, combining electronic recognition with mechanical unlocking to enhance adaptability in various usage scenarios while improving anti-theft and security performance. Users can choose the most convenient unlocking method based on their habits, ensuring operational flexibility. In case of power anomalies or system failures, the mechanical lock module 206 still enables reliable unlocking, thereby improving overall safety and stability. The charging port 229 is preferably a universal USB Type-C interface, compatible with charging cables for most common devices like smartphones and tablets, eliminating the need for specialized cables and further enhancing the steering wheel lock's convenience.

Figure 7:
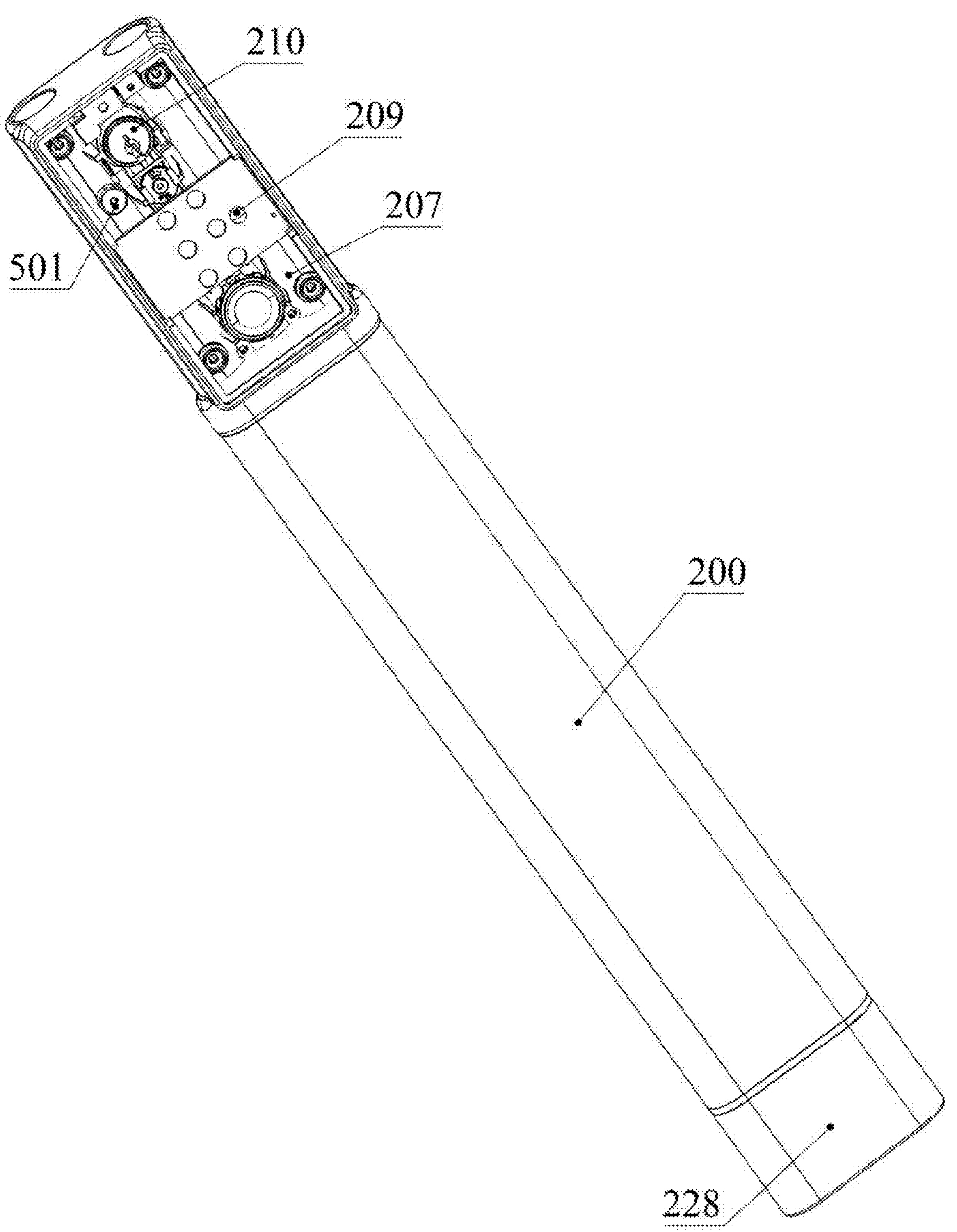
FIG. 7 is a structural schematic view of the locking assembly in the embodiment shown in FIG. 6.
Figure 8:
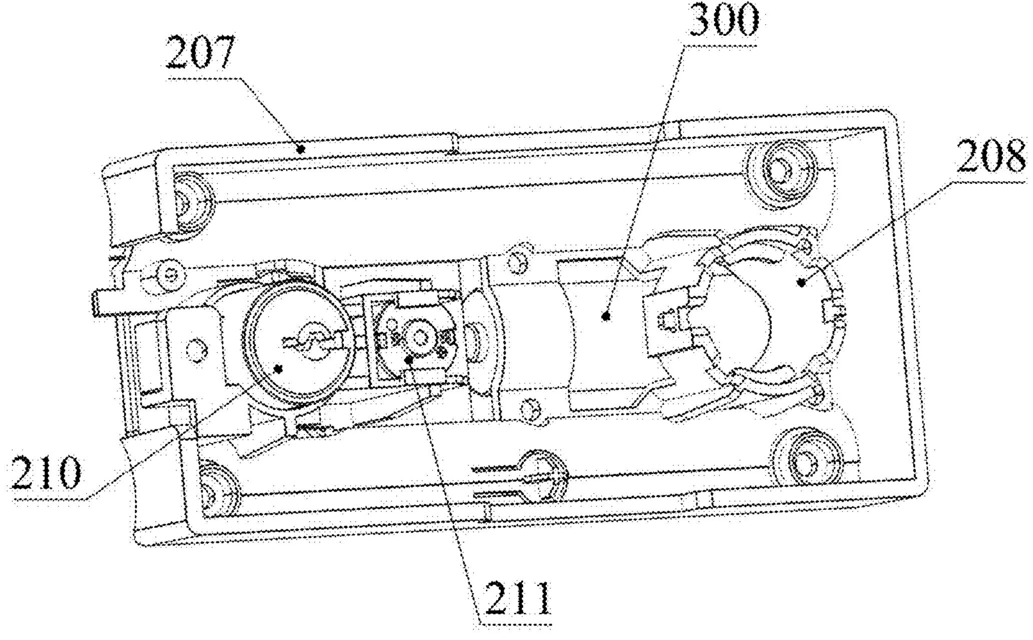
FIG. 8 is a structural schematic view of the fixing frame in the embodiment shown in FIG. 1.

Refer to FIGS. 7 and 8. The locking assembly 202 has a fixing frame 207 embedded inside, which is equipped with multiple installation grooves 208 for mounting other internal components, providing a stable foundation for functional modules. This structure ensures internal parts are assembled in predetermined positions, maintaining a compact and orderly layout while improving the locking assembly 202's structural strength and vibration resistance. It also reduces component loosening caused by external forces or vibrations during use. In other embodiments of the present disclosure (not shown), the fixing frame 207 may be omitted based on structural requirements, and internal components can be directly installed inside the locking assembly 202 through bolts, snaps, or other methods to simplify the structure or reduce manufacturing costs, achieving a reasonable balance between strength, assembly convenience, and cost-effectiveness.

As shown in FIGS. 3, 7, and 8, the fixing frame 207 is equipped with a control circuit board 209 at positions corresponding to the fingerprint lock 203, password key 204, and sensing area 205. This board is used to receive and process various electronic unlocking signals, providing effective control over the operation of the locking mechanism. At the position corresponding to the mechanical lock module 206, the fixing frame 207 is provided with a drive mechanism, which includes a mechanical lock assembly and an electronic lock assembly. The mechanical lock assembly consists of a lock cylinder 210 and a mechanical drive disc 215, while the electronic lock assembly includes a motor 211, a gear drive assembly and an electronic drive disc 2150. The output end of the motor 211 is connected to the gear drive assembly.

The lock cylinder 210 and the mechanical drive disc 215 are fixedly connected through a mechanical transmission shaft 212 installed therebetween. Between the motor 211 and the electronic drive disc 2150, a gear drive structure and an electronic transmission shaft 2120 are arranged, transmitting power through the gear drive mechanism and the electronic transmission shaft 2120. The gear drive structure includes a driving gear 213, and the electronic transmission shaft 2120 includes a driven gear 214 meshing with the driving gear 213. One end of the electronic transmission shaft 2120 is connected to the driving gear 213 for transmission, while the other end is fixedly connected to the electronic drive disc 2150. Upon receiving an electronic unlock signal from the control circuit board 209, the motor 211 drives the electronic drive disc 2150 to rotate through the linkage of the driving gear 213 and the driven gear 214, achieving electronic unlocking or locking. The two transmission paths are entirely independent. During electronic unlocking, the motor 211 drives the electronic drive disc 2150 through the driving gear 213, the driven gear 214 and the electronic transmission shaft 2120 without affecting the transmission state of the lock cylinder 210 and the mechanical transmission shaft 212. Conversely, when operating the lock cylinder 210 with a mechanical key to drive the mechanical drive disc 215 through the mechanical transmission shaft 212, the linkage logic between the motor 211 and the gear drive structure remains undisturbed. Even if the motor 211 or its associated driving gear 213 and driven gear 214 are damaged, the user can still unlock the device by operating the lock cylinder 210 and mechanical transmission shaft 212 with a mechanical key to drive the mechanical drive disc 215 to achieve unlocking. Conversely, if the lock cylinder 210 or mechanical transmission shaft 212 fails, the motor 211 can still normally drive the electronic drive disc 2150 through the gear drive structure. The lock cylinder 210 can output torque through the operation of a mechanical key (not shown), rotating the mechanical drive disc 215 to achieve mechanical locking control. The combined use of the motor 211 and the lock cylinder 210 ensures that the locking assembly 202 can smoothly switch between locking and unlocking under either electronic or mechanical operation, enhancing both ease of use and the device's reliability and safety through dual transmission methods.

Figure 16:
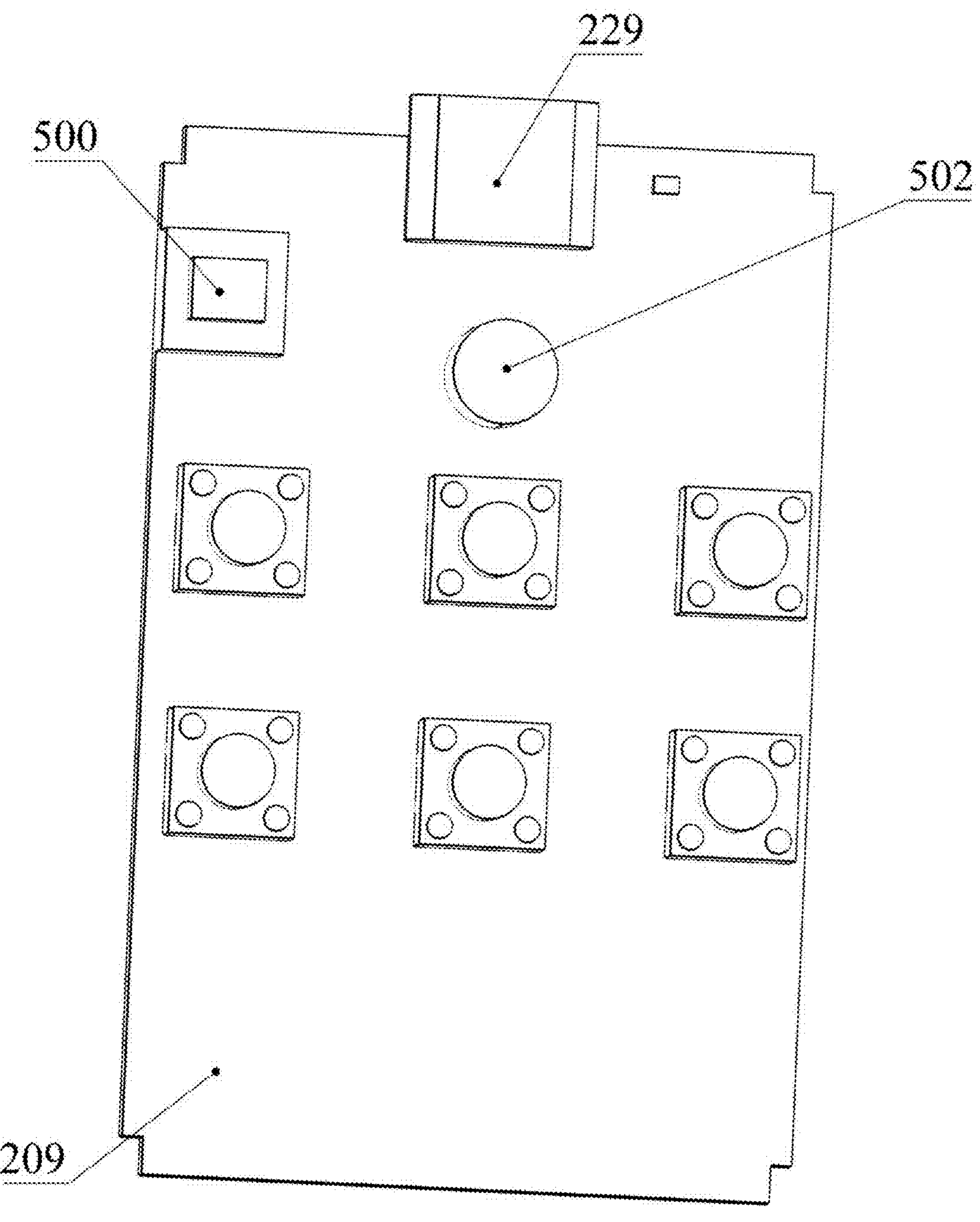
FIG. 16 is a connection schematic view of the anti-prying alarm switch in the embodiment described in FIG. 1.

Specifically, referring to FIG. 16, in this embodiment, the control circuit board 209 also includes an anti-prying alarm switch 500 and a buzzer 501. The anti-prying alarm switch 500 is normally in a pressed and closed standby state and forms an electrical connection with the buzzer 501 and the lighting assembly 502. When external force pries the shell of the locking assembly 202, the deformation of the shell will cause the elastic contact of the anti-prying alarm switch 500 to disengage from its abutment state, triggering a circuit switch. At this point, the control circuit board 209 immediately activates the alarm unit, driving the buzzer 501 to emit a high-decibel continuous alarm sound on one hand, and controlling the lighting assembly 502 on the surface of the locking assembly 202 to flash at a high frequency on the other, creating a dual audio-visual alarm signal. This not only deters theft attempts but also promptly alerts the vehicle owner or nearby individuals to the anomaly.

Figure 9:
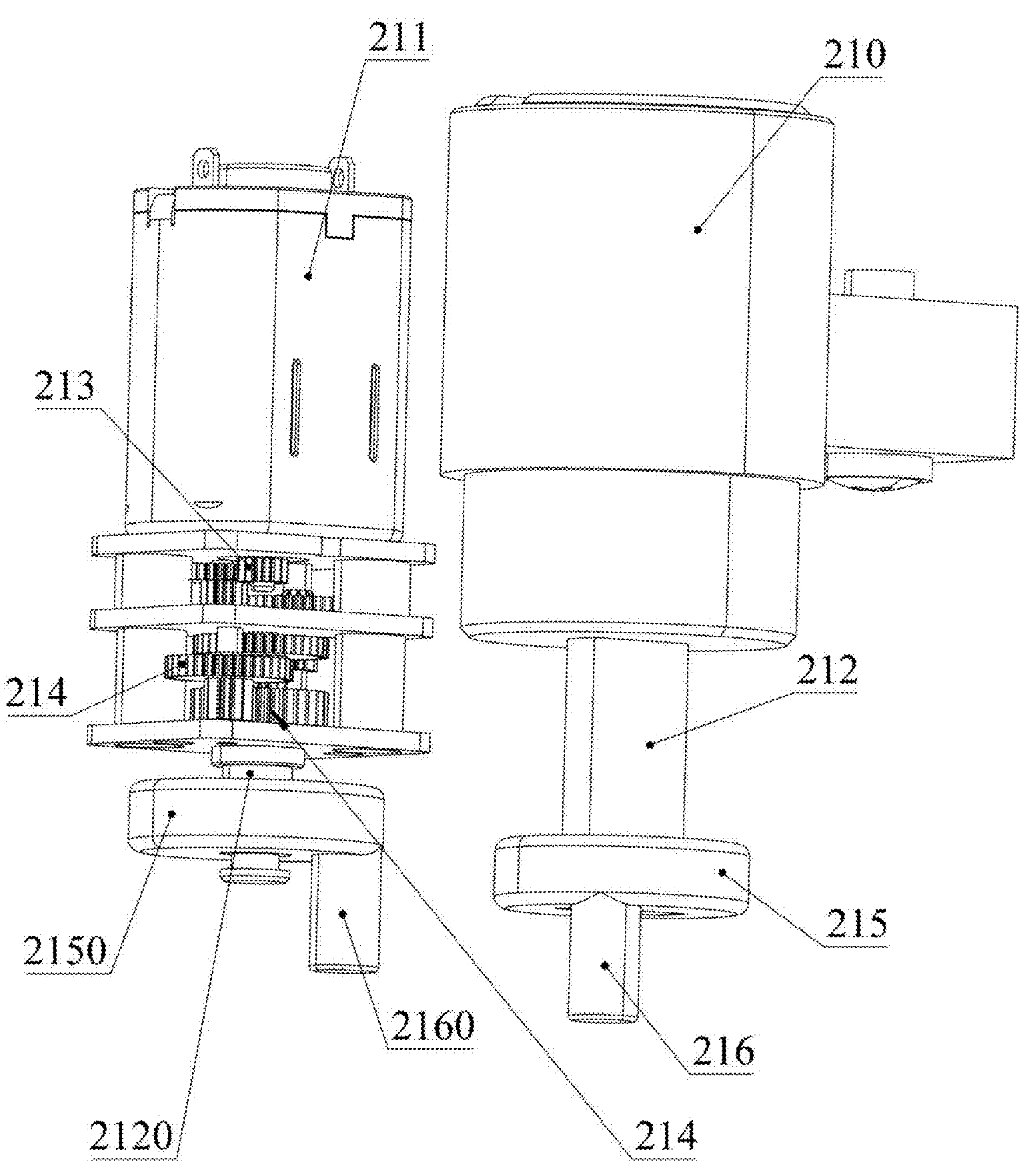
FIG. 9 is a perspective schematic view of the mechanical lock assembly and electronic lock assembly in the embodiment shown in FIG. 1.

Referring to FIG. 9, the mechanical drive disc 215 is equipped with a mechanical drive shaft 216, and the electronic drive disc 2150 is equipped with an electronic drive shaft 2160. On the fixing frame 207, a locking plate 217 is positioned corresponding to the mechanical drive shaft 216 and the electronic drive shaft 2160. The locking plate 217 is provided with a mechanical drive hole 218 that matches the mechanical drive shaft 216 and an electronic drive hole 2180 that matches the electronic drive shaft 2160, allowing the mechanical drive shaft 216 and the electronic drive shaft 2160 to be embedded into the mechanical drive hole 218 and the electronic drive hole 2180 respectively, forming a mechanical linkage structure. When the mechanical lock assembly drives the mechanical drive disc 215 to rotate through the mechanical transmission shaft 212, the mechanical drive shaft 216 moves in a circular motion along with the mechanical drive disc 215 and continuously abuts the inner wall of the mechanical drive hole 218, converting the rotational force into a linear motion that pushes the locking plate 217 along a predetermined path. Conversely, when the electronic lock assembly rotates the electronic drive disc 2150 through the linkage of the driving gear 213 and the driven gear 214, the electronic drive shaft 2160 moves in a circular motion along with the electronic drive disc 2150 and continuously abuts the inner wall of the electronic drive hole 2180, thereby driving the locking plate 217. Through the coordinated interaction of the drive shafts and drive holes, the conversion of rotational motion into linear displacement is achieved, providing a stable power transmission path for the locking or unlocking of the locking assembly 202. This ensures smooth movement of the locking plate 217 and enhances the reliability and stability of the device during the locking and unlocking processes.

Figure 11:
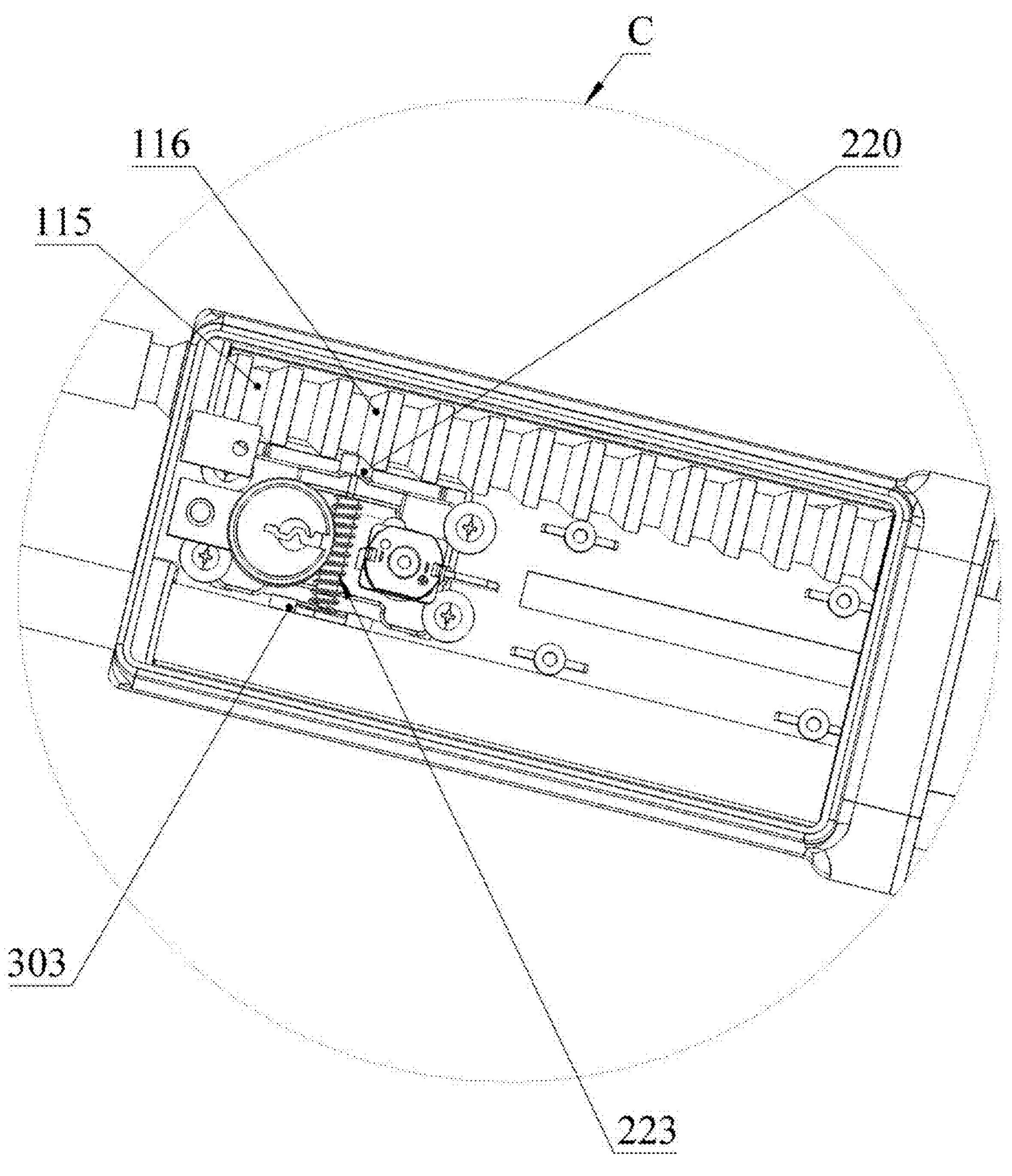
FIG. 11 is a partial schematic view of section C in the embodiment shown in FIG. 10.

Referring to FIGS. 1, 4, and 11, the end of the locking assembly 202 away from the fingerprint lock 203, password key 204, sensing area 205, and mechanical lock module 206 is internally equipped with a power supply assembly 300 and a sliding groove 301, with a limiting part 303 at the bottom to provide directional support for internal components. A locking mechanism is installed in the sliding groove 301, preferably a locking plate 217, which is plate-shaped overall and integrally formed with a horizontally arranged top plate 219 at the top. The center of the top plate 219 protrudes upward to form an abutting part, preferably an engaging post 220, which can be engaged with the unidirectional locking groove 115 on the locking rod 114 of the sliding part 100, achieving the locking between the locking assembly 202 and the sliding part 100. A second inclined surface 221 is provided at the contact position between the engaging post 220 and the first inclined surface 116 of the unidirectional locking groove 115. This structure allows the sliding part 100 to be pulled out in a specific direction to increase spacing when locked but prevents the sliding part 100 from being reinserted in the opposite direction, creating a unidirectional self-locking effect and enhancing the safety and protective capability of the locking device during use.

Figure 12:
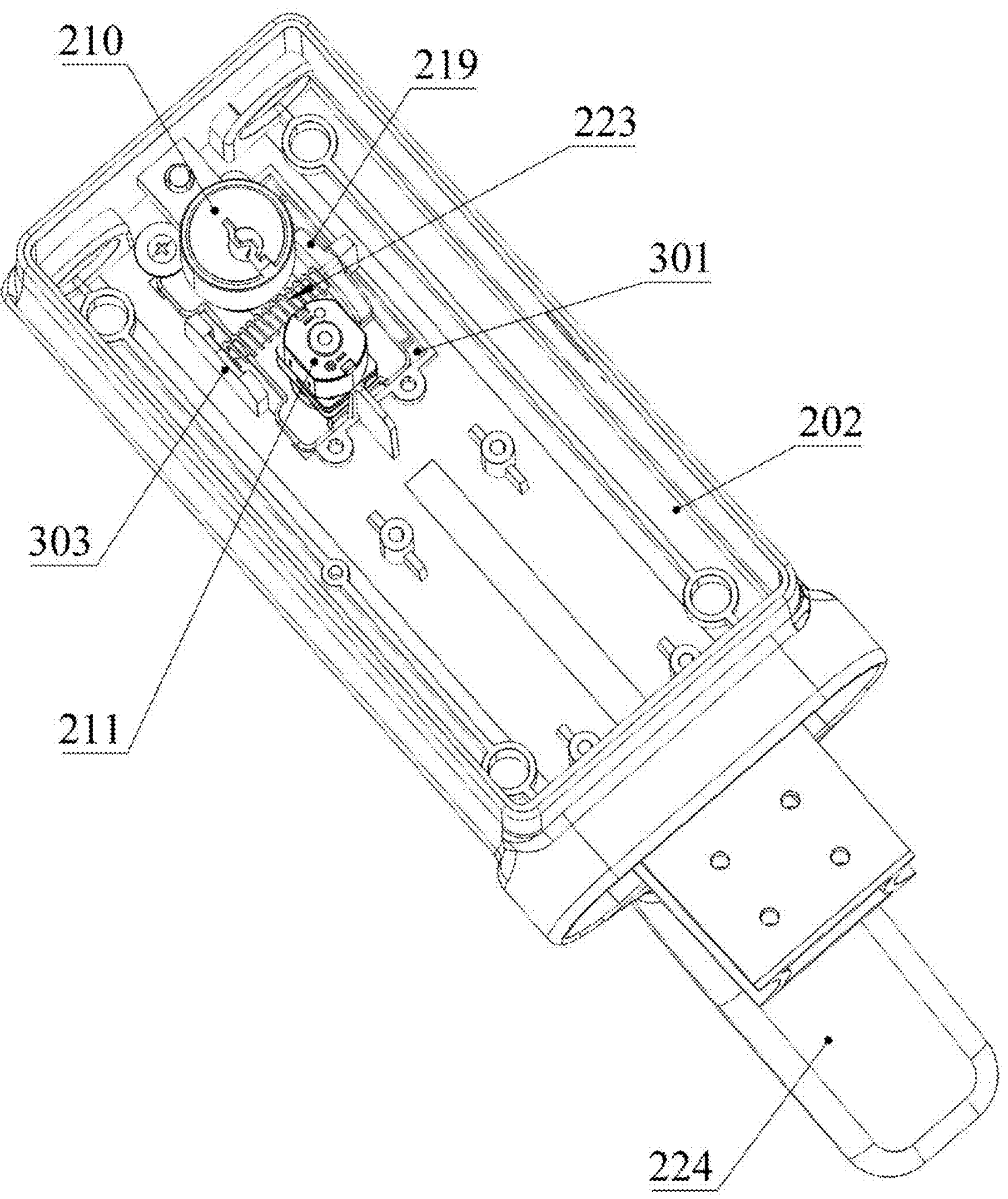
FIG. 12 is a perspective schematic view of the locking assembly in the embodiment shown in FIG. 1.
Figure 13:
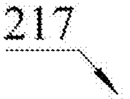
FIG. 13 is a perspective schematic view of the locking plate in the embodiment shown in FIG. 1.
Figure 13:
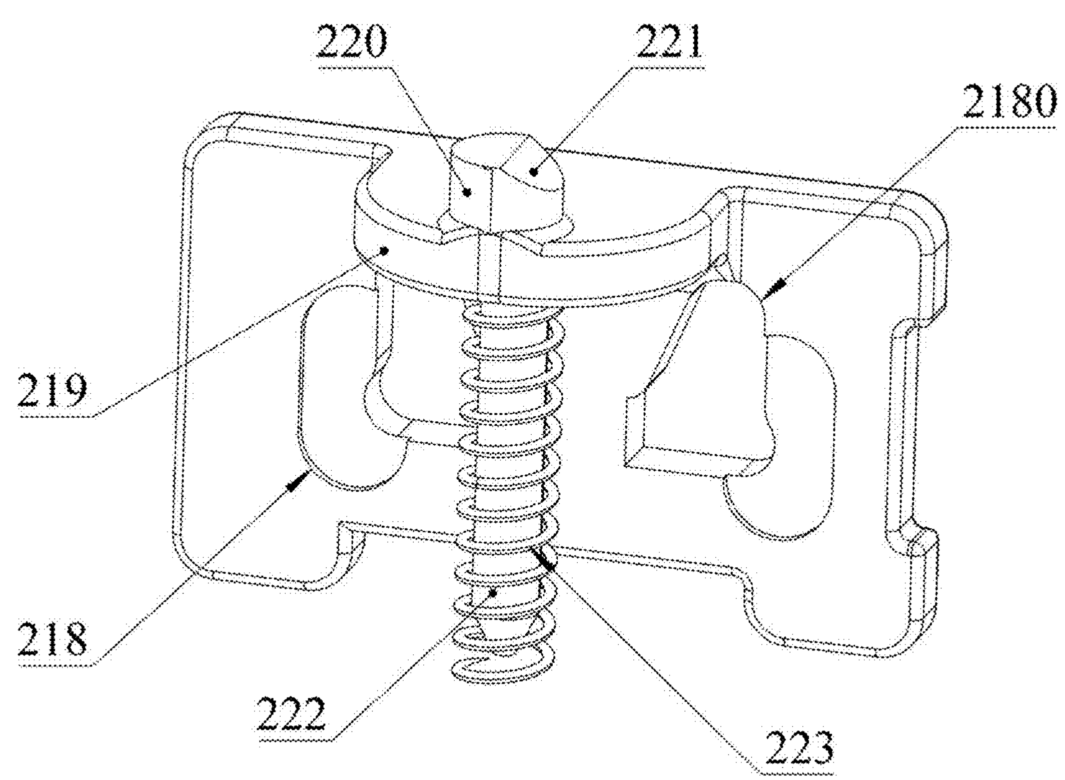

As shown in FIGS. 12 and 13, an extension post 222 extends vertically downward from the top plate 219, and a rebound mechanism, preferably a spring 223, is arranged on the extension post 222. The spring 223 is sleeved on the extension post 222 and contacts both the top plate 219 and the limiting part 303 respectively. When the sliding part 100 and the locking assembly 202 are in the locked state, the engaging post 220 is engaged with the unidirectional locking groove 115 of the locking rod 114, and the spring 223 is compressed by the top plate 219, storing elastic force and continuously acting upward on the top plate 219, thereby enhancing the contact tightness between the engaging post 220 and the unidirectional locking groove 115 and reducing the risk of disengagement under external force. When an unlocking signal drives the rotating disk and moves the locking plate 217 along the sliding groove 301, the spring 223 gradually releases the stored elastic potential energy with the displacement of the extension post 222. On one hand, this provides auxiliary force for the sliding of the locking plate 217, helping to overcome friction and complete the displacement; on the other hand, after the engaging post 220 disengages from the unidirectional locking groove 115, the rebound force pushes the locking plate 217 back to its initial position, maintaining a stable posture for the next locking action, thus improving the reliability and repeatability of the locking device.

Referring to FIG. 11, since the second inclined surface 221 on the engaging post 220 corresponds to the first inclined surface 116 on the one-way locking groove 115, with the first inclined surface 116 located on the side of the one-way locking groove 115 away from the fixing part 101, in the locked state, when force is applied between the sliding part 100 and the locking assembly 202, the sliding part 100 can be pulled out from the locking assembly 202 in a specific direction, but a certain external force is required to achieve this, thereby moderately increasing the spacing between the two. In the opposite direction, due to the engagement between the engaging post 220 and the one-way locking groove 115, the sliding part 100 cannot be reinserted toward the locking assembly 202, thus limiting the reduction in spacing. This design creates a one-way self-locking effect, helping to prevent accidental insertion or unlocking, and improving the safety and reliability of the locking device during use.

Figure 14:
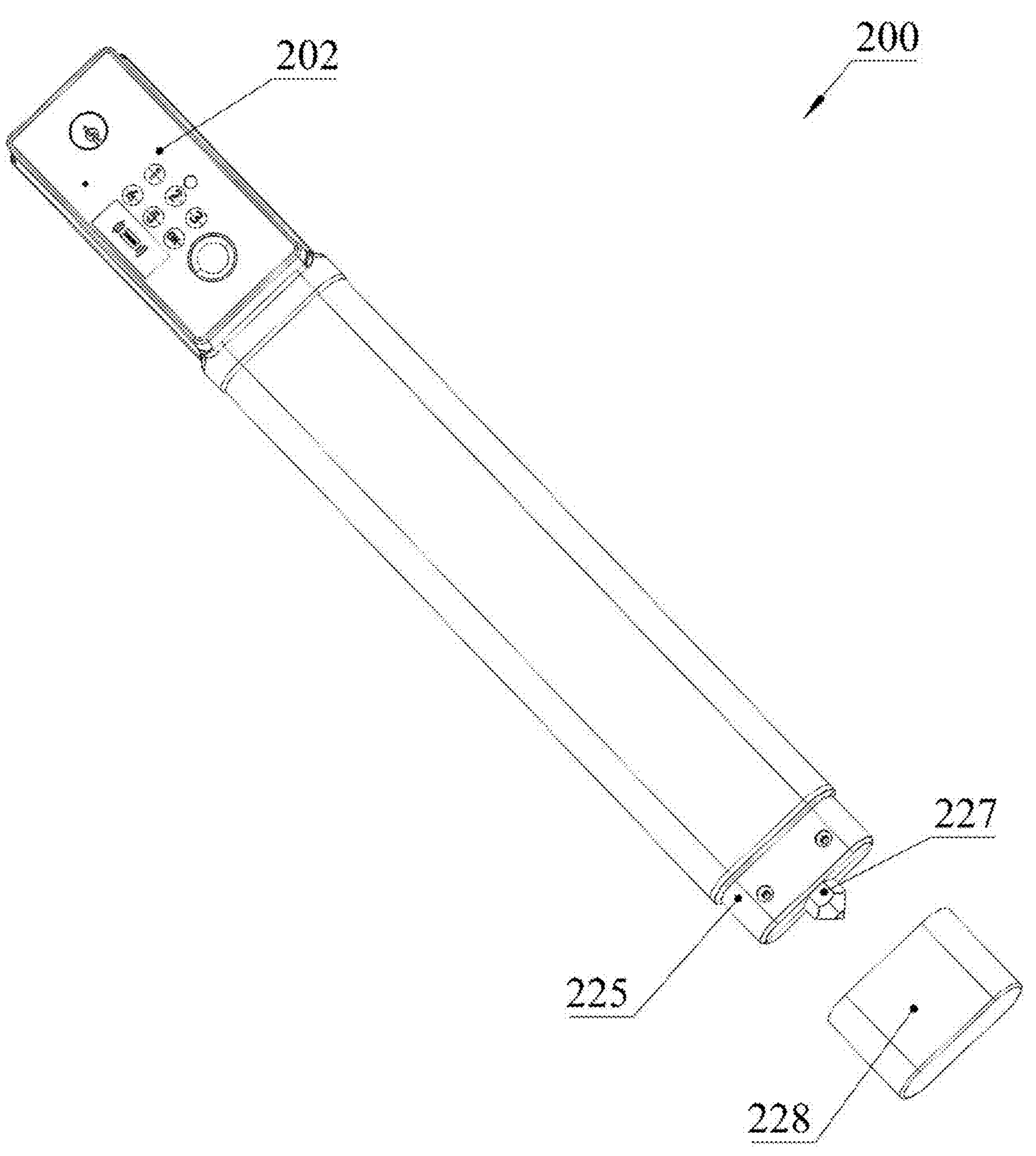
FIG. 14 is a structural schematic view of the window breaking part in the embodiment shown in FIG. 11.
Figure 15:
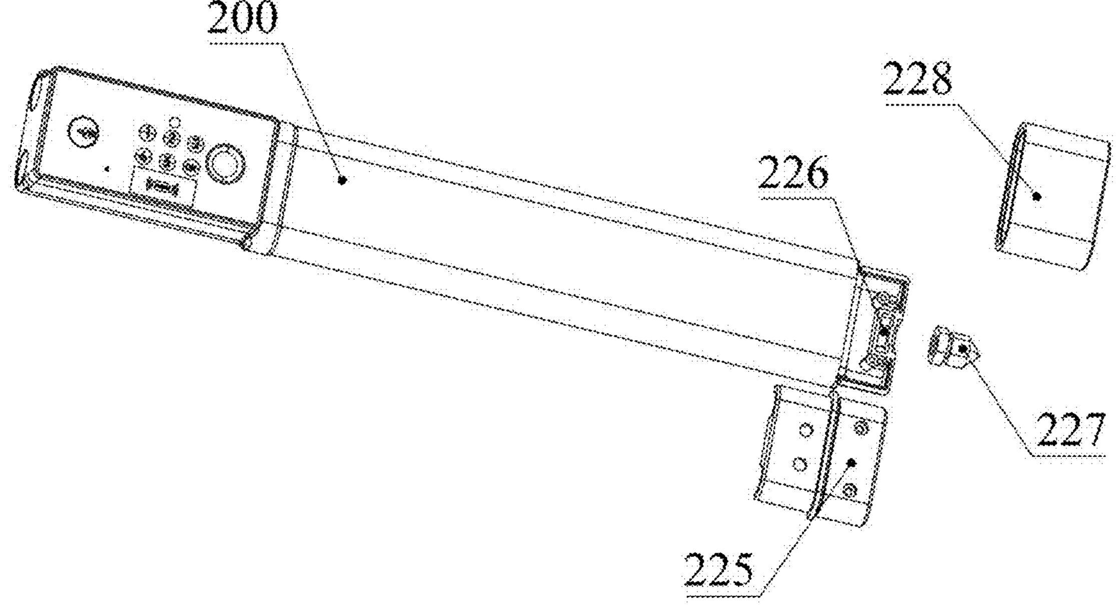
FIG. 15 is an exploded schematic view of the window breaking part in the embodiment shown in FIG. 14.

Specifically, referring to FIGS. 12, 14, and 15, in this embodiment, the end of the locking assembly 202 away from the sliding part 100 is provided with a right clamping jaw 224, which extends from the locking assembly 202 away from the sliding part 100. The distal end of the main body 200 is equipped with a window breaking part 225, which contains an engaging groove 226. A window breaking hammer 227 is fixed within the engaging groove 226. In emergencies such as vehicle submersion or collision where the doors are locked, the driver can use the window breaking hammer 227 to shatter the window and create an escape route. The integrated design of the window breaking hammer 227 with the locking device leverages the "must-use, must-carry" nature of the steering wheel lock, avoiding the issue of standalone window-breaking tools being easily forgotten or lost. Additionally, the layout of the window breaking part 225 aligns with the driver's operational habits, enabling quick access in emergencies and helping to reduce escape response time. This design combines anti-theft and emergency functions in the locking device without adding storage burden, providing dual safety guarantees. Furthermore, the window breaking part 225 is externally fitted with a protective cover 228, which not only enriches the device's functionality but also enhances its safety and protective performance.

As shown in FIGS. 1, 2, 3, 5, 9, 14, and 17, when using this device, align the sliding part 100 and the main body 200 with the steering wheel position, ensuring the left clamping jaw 109 and the right clamping jaw 224 clamp onto the inner side of the steering wheel and abut against it, thereby forming a clamping constraint on the steering wheel. Subsequently, insert the U-shaped pin 112 into the accommodating space 201 of the main body 200 to achieve a detachable connection between the sliding part 100 and the main body 200. After positioning is completed, the control circuit board 209 can be triggered through the fingerprint lock 203, password key 204, sensing area 205, or mechanical lock module 206. The electronic lock assembly drives the electronic drive disc 2150 to rotate through the engagement of the driving gear 213 and the driven gear 214. Alternatively, operating the mechanical lock module 206 with a mechanical key transmits torque from the lock cylinder 210 through the mechanical transmission shaft 212, causing the drive shaft 216 to rotate with the mechanical drive disc 215 and act on the mechanical drive hole 218 of the locking plate 217. This converts the rotational torque into linear displacement of the locking plate 217 along the sliding groove 301, driving the top plate 219 and the engaging post 220 to engage with the one-way locking groove 115 on the locking rod 114 of the U-shaped pin 112, thereby locking the sliding part 100 with the locking assembly 202. In the locked state, the spring 223 is compressed between the extension post 222 and the limiting part 303, enhancing the fit between the engaging post 220 and the one-way locking groove 115 to reduce the risk of accidental unlocking due to external force. The second inclined surface 221 on the engaging post 220 and the first inclined surface 116 on the one-way locking groove 115 form a one-way self-locking feature, allowing the sliding part 100 to be pulled out with significant force in a specific direction to increase spacing but making reinsertion difficult in the opposite direction to prevent accidental movement. To release the lock, the control circuit board 209 sends an electronic unlock signal, or the mechanical lock module 206 is operated with a mechanical key, driving the corresponding drive disc and drive shaft to move. The locking plate 217 slides along the sliding groove 301, and the spring 223 gradually releases, pushing the locking plate 217 back to its initial position after the engaging post 220 disengages from the one-way locking groove 115, completing the unlocking process. If the power supply assembly 300 is depleted, the user can also perform mechanical unlocking through the mechanical lock module 206 and its matching mechanical key to drive the lock cylinder 210 and the mechanical transmission shaft 212, ensuring usability. The charging port 229 provides a means to recharge the power supply assembly 300 and restore electronic functionality. In emergencies where the car door is locked, the user can retrieve the window breaking hammer 227, which is engaged in the engaging groove 226, from the window breaking part 225 at the distal end of the main body 200, for emergency window breaking. The window breaking part 225 is equipped with an external protective cover 228 to balance daily protection and quick access. If the locking assembly 202 is subjected to violent prying, the housing deforms under external force, causing the inner wall in contact with the anti-prying alarm switch 500 to shift, immediately activating the buzzer 501 to sound and the lighting assembly 502 to flash. Through the above operational process, the device constrains the steering wheel's rotation through physical clamping and mechanical/electronic linkage, combining anti-theft and emergency functions to enhance convenience and reliability in use.

Figure 17:
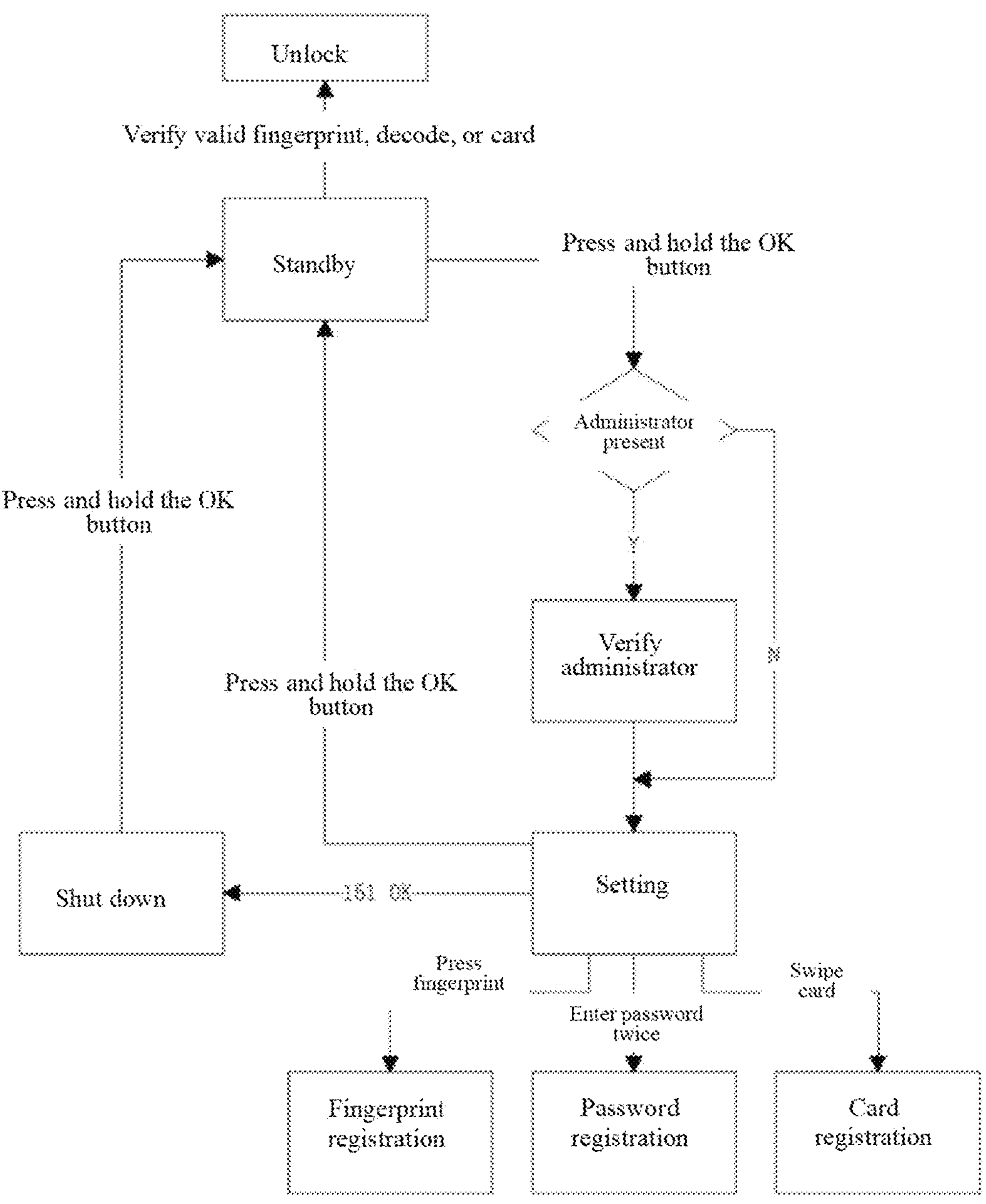
FIG. 17 is a control flow logic diagram of the embodiment described in FIG. 1.
Figure 18:
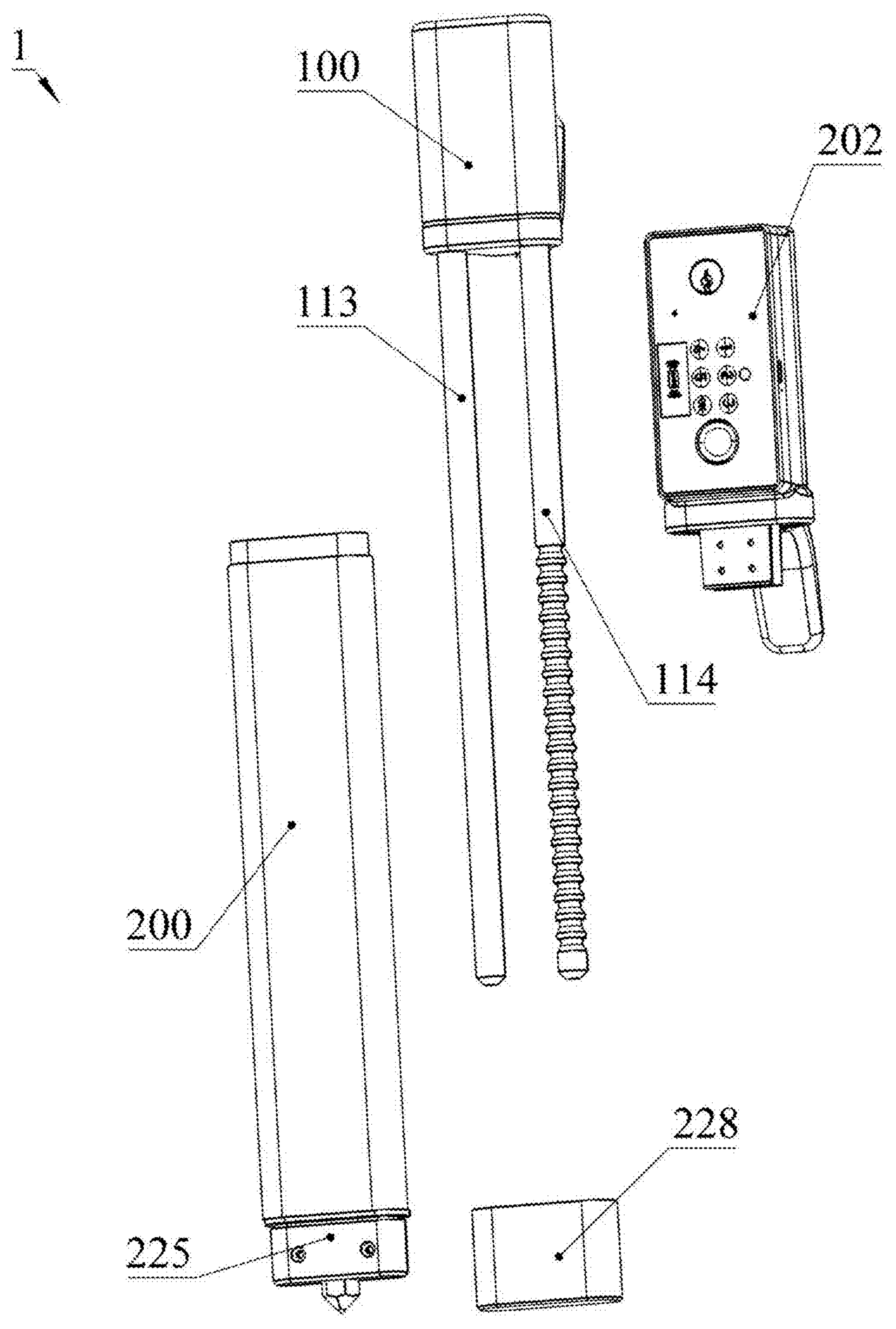
FIG. 18 is an exploded schematic view of the embodiment described in FIG. 1.
Figure 19:
FIG. 19 is an exploded schematic view of the locking assembly in the embodiment described in FIG. 18.
Figure 19:
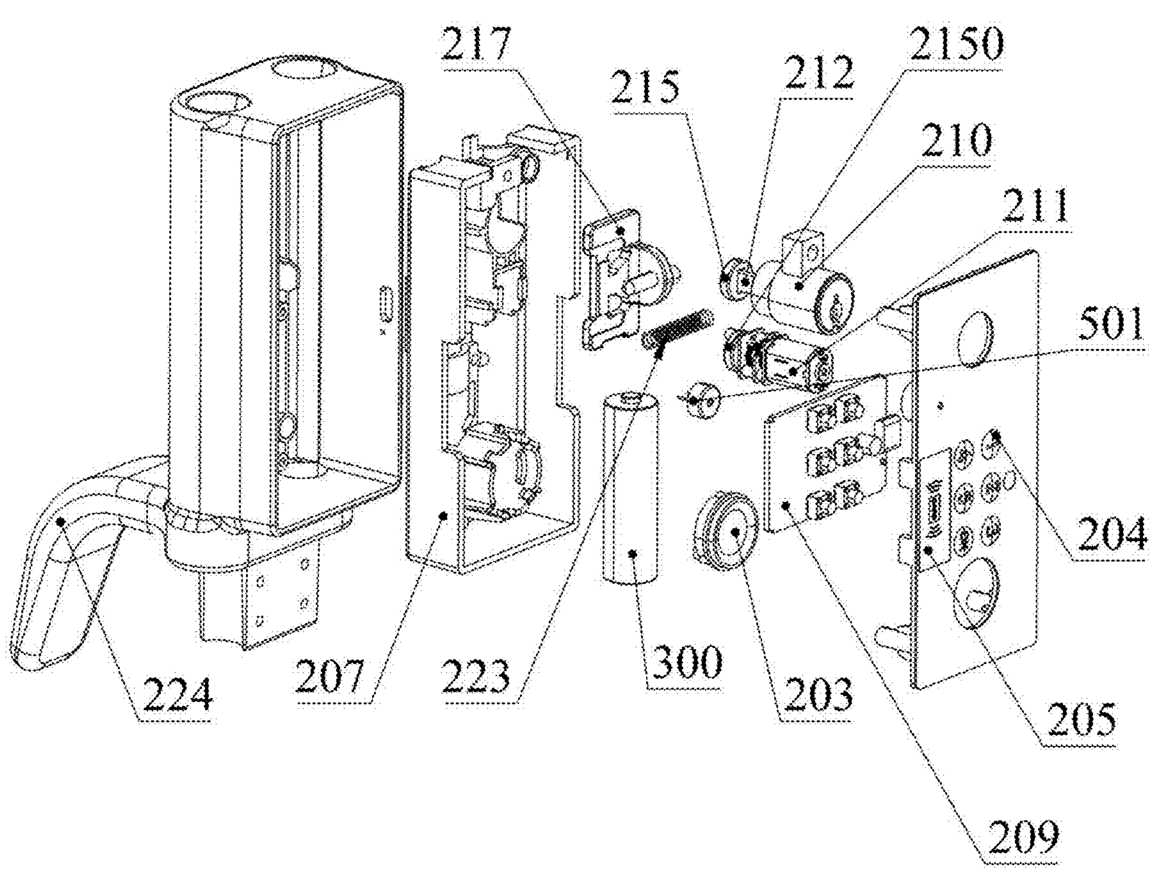

Specifically, refer to FIG. 17. After the automobile steering wheel locking device completes unlocking, it enters standby mode. At this point, holding down the OK key triggers two types of operations: one is that if the "151+OK" key combination is pressed after holding the OK key, the device will directly shut down, ceasing all functions; the other is that if no key combination is executed after holding the OK key, the device proceeds to the administrator privilege verification step. If an administrator has been pre-registered in the system (e.g., through the fingerprint lock 203, password key 204, or mechanical lock module 206), a matching verification method (such as administrator fingerprint or password authentication-retry if verification fails) must first be passed to access the settings page. If no administrator is set, verification is skipped, and the settings page can be accessed directly.

After entering the settings page, three core registration operations can be performed for device unlocking methods: first, the fingerprint lock 203 is operated by pressing the fingerprint recognition area to enter the fingerprint registration page, where new fingerprints can be recorded and bound, and the newly bound fingerprint then serves as valid credentials for future unlocking second, the password is input twice consecutively through the password key 204 (ensuring consistency to avoid errors) to access the password registration page and set a new unlock password; third, a sensing card is placed near the sensing area 205 to enter the card registration page, where new card information is read and bound, enabling future unlocking with the card.

In the settings page, other states can be switched through key presses: holding the OK key exits the current settings page and returning to standby mode, awaiting the next unlock or operation command; pressing the "151+OK" key combination in the settings page directly triggers the shutdown process, deactivating the device until it is reactivated by valid means (e.g., mechanical key driving the mechanical lock module 206 or fingerprint verification). This design ensures security by requiring administrator verification to prevent unauthorized modifications, while offering diverse registration options for flexible unlocking. Clear key logic simplifies operation, balancing anti-theft safety with user convenience.

The above are merely preferred embodiments of the present disclosure and are not intended to limit it. For those skilled in the art, the present disclosure may undergo various modifications and changes. Any amendments, equivalent substitutions, or improvements made within the spirit and principles of the present disclosure shall fall within its scope of protection.

What is claimed is:

1. An automobile steering wheel locking device, comprising:

- a sliding part provided with a left clamping jaw for gripping a steering wheel and a locking rod extending away from the left clamping jaw, a side wall of the locking rod being provided with at least one locking groove;
- a main body detachably connected to the sliding part and provided with a right clamping jaw for gripping the steering wheel and arranged opposite to the left clamping jaw, the main body comprising a sliding groove;

a locking assembly arranged inside the main body, the locking assembly comprising:

a mechanical lock module, comprising a mechanical lock assembly drivable by a mechanical key, the mechanical lock assembly being provided with a mechanical drive shaft, wherein the mechanical lock assembly comprises a lock cylinder, a mechanical transmission shaft and a mechanical locking disc, with one end of the mechanical transmission shaft being drivingly connected to the lock cylinder and another end fixedly connected to the mechanical locking disc;

the mechanical lock assembly is configured so that when the mechanical lock assembly is driven by a mechanical key, the lock cylinder rotates the mechanical locking disc through the mechanical transmission shaft;

an electronic lock module, comprising an electronic lock assembly that receives a control signal and drives an action, the electronic lock assembly being provided with an electronic drive shaft; and a locking plate slidably installed in the sliding groove of the main body, the locking plate being provided with two drive holes respectively matching the mechanical drive shaft and the electronic drive shaft, enabling either drive shaft to rotate and drive the locking plate to move within the sliding groove, the locking plate further being provided with an abutting part matching the locking groove, wherein the two drive holes comprise a mechanical drive hole and an electronic drive hole, the mechanical drive hole being configured for receiving the mechanical drive shaft, and the electronic drive hole being configured for receiving the electronic drive shaft, wherein the abutting part has a second inclined surface, the locking groove has a first inclined surface, and the first inclined surface cooperates with the second inclined surface to achieve locking and unlocking between the locking groove and the abutting part, wherein the locking plate further comprises an extension post extending downward from a bottom thereof, the extension post comprises a rebound mechanism, and an elastic force of the rebound mechanism acts on the locking plate to keep the abutting part tightly fitted with the locking groove;

wherein movement of the locking plate drives the abutting part thereon to cooperate with a locking rod of the sliding part to achieve locking or unlocking of the steering wheel; and transmission paths of the mechanical lock module and the electronic lock module are independent of each other, and either module is capable of individually driving the locking plate to complete locking or unlocking operations.

2. The automobile steering wheel locking device according to claim 1, wherein a mechanical drive shaft is eccentrically arranged on the mechanical drive disc, and when the mechanical drive disc rotates, the mechanical drive shaft converts a rotational force into a thrust force that drives the locking plate to slide within the sliding groove by abutting against an inner wall of the mechanical drive hole.

3. The automobile steering wheel locking device according to claim 1, wherein the electronic lock assembly comprises a motor, a gear drive assembly, an electronic transmission shaft and an electronic locking disc, with the motor being drivingly connected to the gear drive assembly, one end of the electronic transmission shaft being drivingly connected to the gear drive assembly, and another end of the electronic transmission shaft fixedly connected to the electronic locking disc; and when the electronic lock assembly receives a control signal, the motor rotates the electronic locking disc through the gear drive assembly and the electronic transmission shaft.

4. The automobile steering wheel locking device according to claim 3, wherein the electronic drive shaft is eccentrically arranged on an electronic drive disc, and when the electronic drive disc rotates, the electronic drive shaft converts a rotational force into a thrust force that drives the locking plate to slide within the sliding groove by abutting against an inner wall of the electronic drive hole.

5. The automobile steering wheel locking device according to claim 1, wherein the main body comprises a control circuit board, an alarm unit and an anti-prying alarm switch, with the alarm unit and the anti-prying alarm switch being electrically connected to the control circuit board, and when a main body housing is disassembled, triggering the anti-prying alarm switch, the control circuit board receives a signal and activates the alarm unit.

6. The automobile steering wheel locking device according to claim 5, wherein a method for unlocking the electronic lock assembly comprise at least one of the following: fingerprint recognition, password recognition, card swiping recognition, and APP unlocking.

7. The automobile steering wheel locking device according to claim 5, wherein the control circuit board is electrically connected to the electronic lock assembly, and the control circuit board is configured to also receive an external control signal through WiFi communication or Bluetooth communication to control locking and unlocking of the electronic lock assembly.

8. An automobile steering wheel locking device, comprising:

a sliding part provided with a left clamping jaw for gripping a steering wheel and a locking rod extending away from the left clamping jaw, a side wall of the locking rod being provided with at least one locking groove;

a main body detachably connected to the sliding part and provided with a right clamping jaw for gripping the steering wheel and arranged opposite to the left clamping jaw, the main body comprising a sliding groove;

a locking assembly arranged inside the main body, the locking assembly comprising:

a mechanical lock module, comprising a mechanical lock assembly drivable by a mechanical key, the mechanical lock assembly being provided with a mechanical drive shaft, wherein the mechanical lock assembly comprises a lock cylinder, a mechanical transmission shaft and a mechanical locking disc, with one end of the mechanical transmission shaft being drivingly connected to the lock cylinder and another end fixedly connected to the mechanical locking disc;

the mechanical lock assembly is configured so that when the mechanical lock assembly is driven by a mechanical key, the lock cylinder rotates the mechanical locking disc through the mechanical transmission shaft;

an electronic lock module, comprising an electronic lock assembly that receives a control signal and drives an action, the electronic lock assembly being provided with an electronic drive shaft; and a locking plate slidably installed in the sliding groove of the main body, the locking plate being provided with two drive holes respectively matching the mechanical drive shaft and the electronic drive shaft, enabling either drive shaft to rotate and drive the locking plate to move within the sliding groove, the locking plate further being provided with an abutting part matching the locking groove;

wherein movement of the locking plate drives the abutting part thereon to cooperate with a locking rod of the sliding part to achieve locking or unlocking of the steering wheel; and transmission paths of the mechanical lock module and the electronic lock module are independent of each other, and either module is capable of individually driving the locking plate to complete locking or unlocking operations.

* * * * *